US007974422B1

(12) United States Patent
Ho et al.

(10) Patent No.: US 7,974,422 B1
(45) Date of Patent: Jul. 5, 2011

(54) SYSTEM AND METHOD OF ADJUSTING THE SOUND OF MULTIPLE AUDIO OBJECTS DIRECTED TOWARD AN AUDIO OUTPUT DEVICE

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 1468 days.

(21) Appl. No.: 11/213,188

(22) Filed: Aug. 25, 2005

(51) Int. Cl.
*H04B 1/00* (2006.01)

(52) U.S. Cl. .......... 381/119; 381/97; 455/416; 455/512; 455/513

(58) Field of Classification Search .................. 381/119, 381/104, 107, 94.1, 94.2, 102, 103; 700/94; 455/416, 512, 513; 379/93.21, 158, 202.01; 709/204, 207; 370/260–262; 704/226–228, 704/233
See application file for complete search history.

(56) References Cited

U.S. PATENT DOCUMENTS 4,149,032 A * 4/1979 Peters .............................. 381/58
5,652,800 A * 7/1997 Roberts .......................... 381/119
5,910,996 A * 6/1999 Eggers et al. ................. 381/107
7,180,997 B2 * 2/2007 Knappe .................... 379/387.01
2006/0023900 A1 * 2/2006 Erhart et al. .................. 381/119

* cited by examiner

*Primary Examiner* — Vivian Chin
*Assistant Examiner* — Jason R Kurr
(74) *Attorney, Agent, or Firm* — North Shore Patents, P.C.; Michele Liu Baillie

(57) ABSTRACT

Embodiments of the present invention include methods and apparatuses for adjusting audio content when more multiple audio objects are directed toward a single audio output device. The amplitude, white noise content, and frequencies can be adjusted to enhance overall sound quality or make content of certain audio objects more intelligible. Audio objects are classified by a class category, by which they are can be assigned class specific processing. Audio objects classes can also have a rank. The rank of an audio objects class is used to give priority to or apply specific processing to audio objects sin the presence of other audio objects of different classes.

20 Claims, 9 Drawing Sheets

SYSTEM AND METHOD OF ADJUSTING THE SOUND OF MULTIPLE AUDIO OBJECTS DIRECTED TOWARD AN AUDIO OUTPUT DEVICE

FIELD

This invention relates generally to audio data, more specifically, to a system and method of enhancing the listening experience in the presence of multiple audio data directed toward a single audio output device.

RELATED ART

The telephone has been used for person-to-person communications since its inception. New usages emerged in the early 1970's in which users could use the telephone to communicate with machines and automated systems to obtain information such as the time of day, or location and business hours of a merchant. Other more sophisticated usages include call center applications, particularly those empowered by Interactive Voice Response (IVR) technologies. Such applications ranges from auto-attendant, pin code authentication, merchandise ordering, ticket reservation, to complex class registration and financial transactions.

However, due to the sequential nature of conversational communications, using a phone call to navigate large amounts of information and perform complex transactions is inefficient, awkward, and often error prone.

Integration of data communication into telephone usage helps to improve efficiency and to reduce complexity of information presented to a user. Such integration, nevertheless, presents a new challenge. Multiple audio data sources targeting the phone's audio output device may render the overall audio signals unintelligible. For example, audio data playing loud background music may drown out a phone conversation. In another example, the total amplitude of the multiple audio data may exceed the listening tolerance level of a user.

The foregoing illustrates a need to enhance the listening experience for a user when there are multiple audio data directed toward a single audio output device.

SUMMARY

Embodiments of the present invention include methods and techniques of adjusting the sound of multiple audio objects directed toward a single audio output device and combining them into a single output to enhance the intelligibility and performance of such an audio output device.

In one embodiment, the amplitudes of multiple audio objects are adjusted according to the class of the audio objects. The manner and priority in which a given audio object is handled is related directly to the class type of that audio object.

In one embodiment, the amplitudes of multiple audio objects are adjusted based on the ranking of the class of an audio object relative to the rank of the class of other audio objects present. In such an embodiment, higher ranked audio objects are given priority or handled in such as way as to make the higher ranked audio objects more salient or more intelligible than lower ranked audio objects.

Additional embodiments will be evident from the following detailed description and accompanying drawings, which provide a better understanding of the nature and advantages of the present invention.

DETAILED DESCRIPTION

Audio Object

Figure 1:
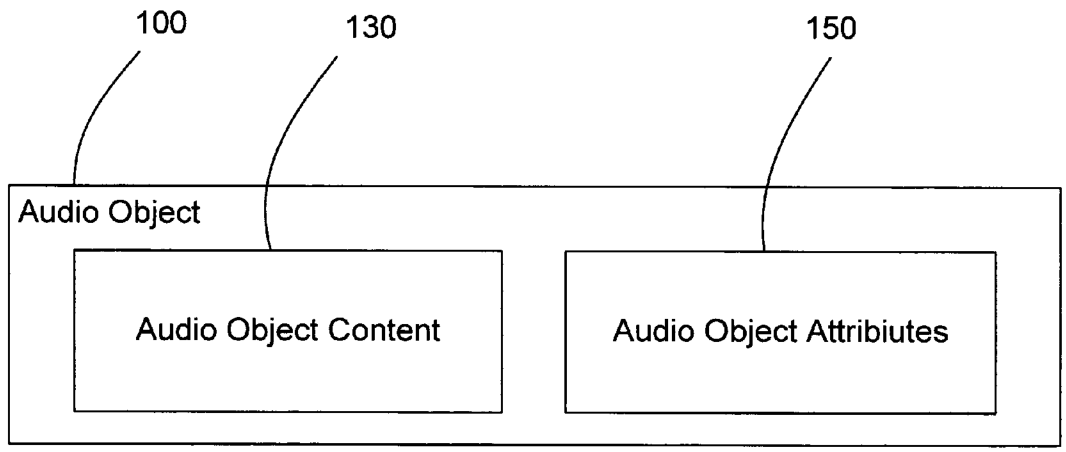
FIG. 1 illustrates a block diagram of an audio object.

FIG. 1 is a block diagram illustrating an audio object. An audio object 100 includes, but is not limited to; audio object content 130 and audio object attributes 150.

Audio object content 130 contains audio data. In one embodiment, the audio data is in uncompressed A-Law Pulse Code Modulation (PCM) format. In one embodiment, the audio data is in uncompressed u-Law Pulse Code Modulation (PCM) format. In one embodiment, the audio data is in G.711 speech codec format. In another embodiment, the audio data is in G723.1 speech codec format. In another embodiment, the audio data is in musical Instrument Digital Interface (MIDI) format. In another embodiment, the audio data is in GSM 6.01 speech codec format. In yet another embodiment, the audio data is in MP3 (MPEG1, Audio Layer 3) format.

Audio object attributes 150 include information about audio object content 130. In one embodiment, audio object attributes 150 include an audio object class. Audio object classes describe an attribute, class or type of audio data stored in audio object content 130. In one embodiment, audio object class is set to one of the following including, but not limited to, announcement class, conversation class or other class. The classification of audio object 100 is stored in audio object attributes 150. For example, an audio object classified as conversation class, a value for indicating "conversation class" is stored in audio object attributes 150. Similarly, for an audio object classified as other class, a value indicating "other class" is stored in audio object attributes 150. As used herein, any audio object that is said to be "classified as" some attribute means that that particular audio object has a value stored in its audio object attributes that indicates that attribute.

In one embodiment, an audio object 100 has audio object class set to announcement class; the audio object content 130 contains audio data of an announcement, such as an emergency or public safety announcement. In another embodiment, an audio object 100 has audio object class set to conversation class; the audio object content 130 contains audio data of a conversion. In yet another embodiment, an audio object 100 has audio object class set to other class; the audio object content 130 contains other audio data.

In one embodiment, audio object content 130 derives audio object attributes 150. In one embodiment, an audio object content 130 contains a frequency pattern of a conversation or a speech, the derived audio object attributes 150 includes an audio object class set to conversation class. In another embodiment, an audio object content 130 contains a frequency pattern of a song or a piece of music, the derived audio object attributes 150 includes an audio object class set to music class.

Audio Output Mixer

Figure 2:
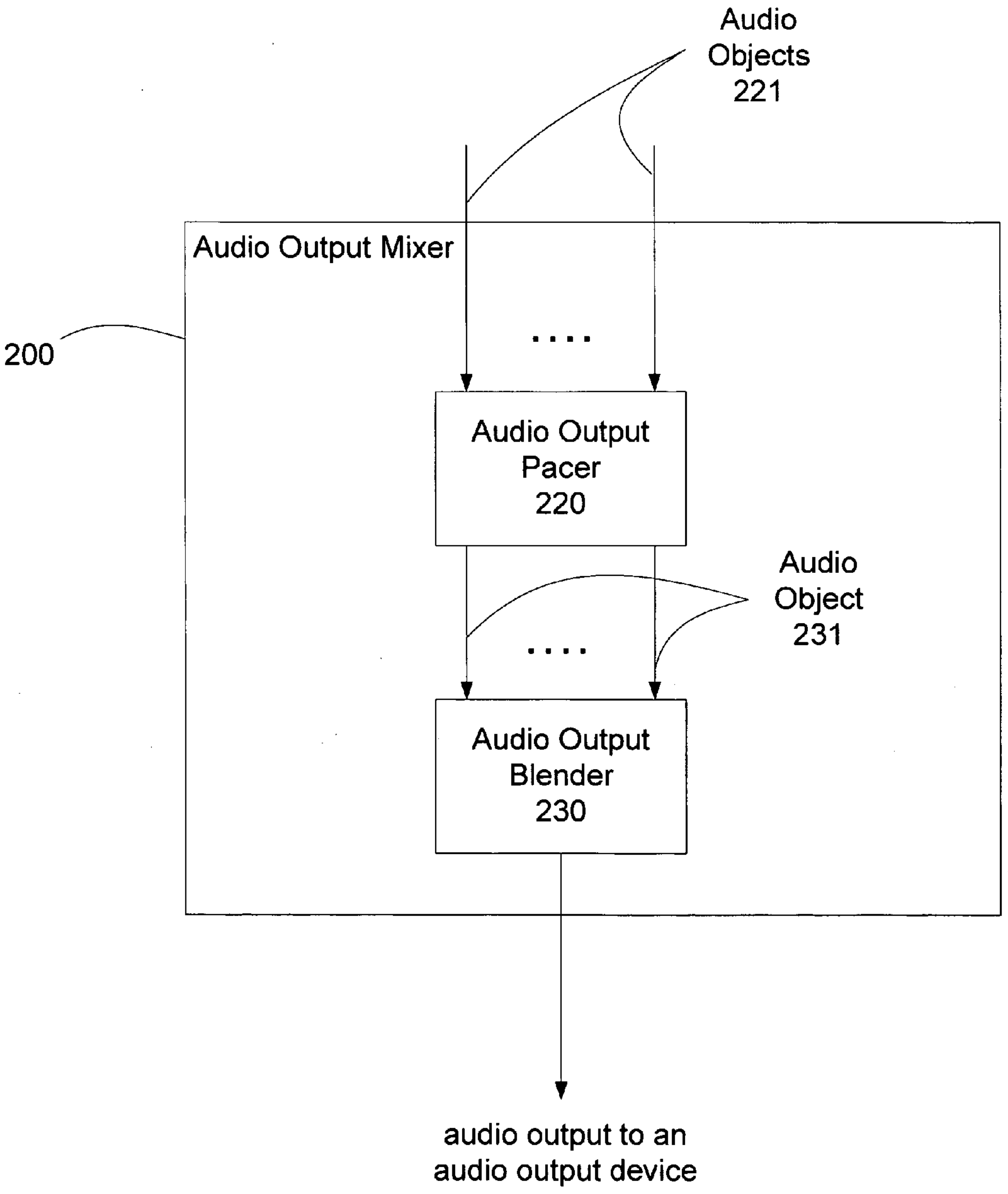
FIG. 2 illustrates a block diagram of an audio output mixer.

FIG. 2 is a block diagram illustrating an audio output mixer. Audio output mixer 200 includes, but is not limited to, an audio output pacer 220 and an audio output blender 230. Audio output pacer 220 connects to audio output blender 230. Audio output blender 230 connects to an audio output device. As used herein, audio output device is any device that bridges the data coming from the audio output blender to a user. Such devices include, but are not limited to, telephones, telephone handsets, headphones, headsets, personal media players, home media players, and speakers.

Audio output mixer 200 can receive a plurality of audio objects 221. Audio output pacer 220 processes the plurality of audio objects 221 in order to conform to the hearing constraints for a person. Audio output pacer 220 can adjust sound levels, frequency ranges and audio speed. Audio output pacer 220 modifies up to all audio objects 221, and sends up to all processed audio objects 221 as audio objects 231 to audio output blender 230. Audio output blender 230 combines audio objects 231 into a single audio output in order to enhance the overall listening comfort. Audio output blender 230 sends a single audio output to an audio output device.

In one embodiment, the functionalities of audio output mixer are implemented in software. In another embodiment, the functionalities of audio output mixer are implemented in a Digital Signal Processor (DSP) or Application Specific Integrated Circuit (ASIC).

Audio Output Pacer

Processing an Audio Object Based on Class

Figure 3:
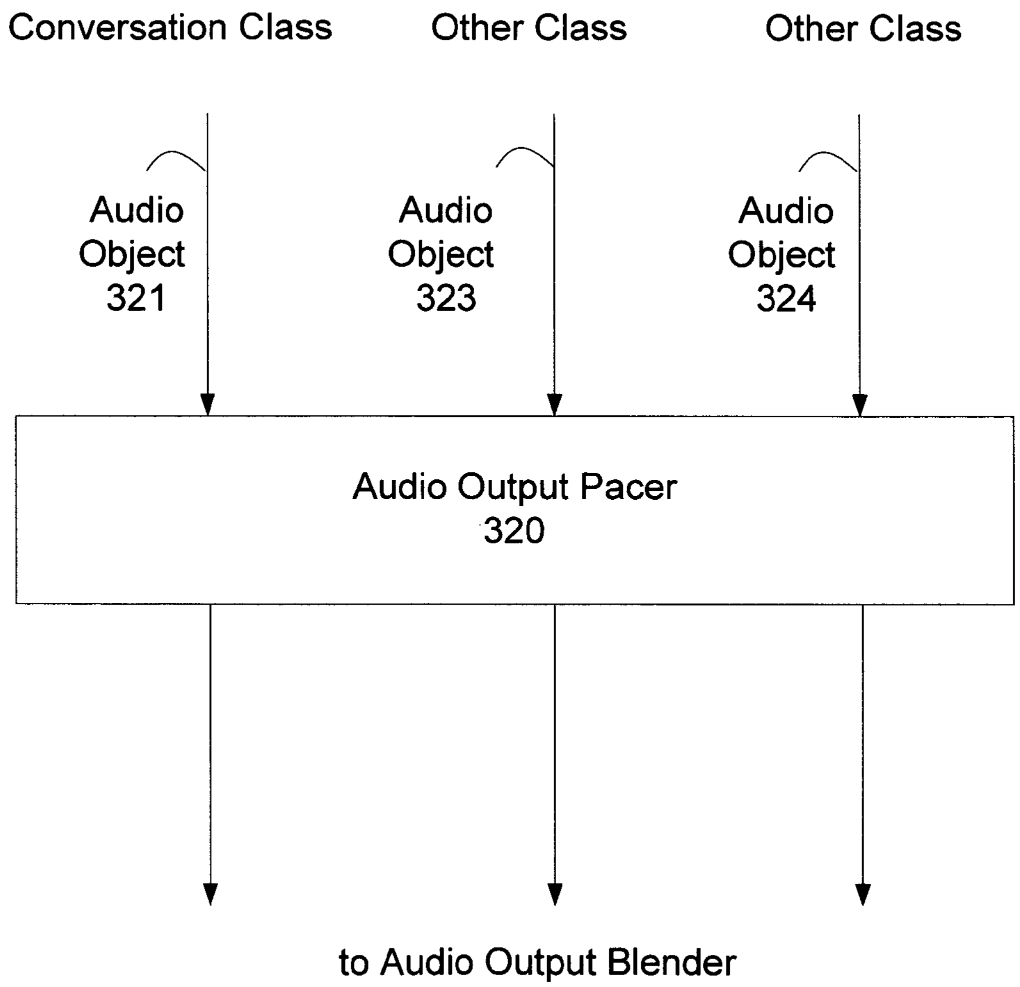
FIG. 3 illustrates a block diagram of a system for adjusting the sound of audio objects based on audio object class.

FIG. 3 illustrates a block diagram of a process performed on audio objects based on audio object class. Audio output pacer 320 processes a plurality of audio objects received by the audio output mixer, giving priority to the audio object classified as conversation class so as to ensure the conversation remains intelligible in the presence of other audio objects. In one embodiment, audio output pacer 320 modifies the audio object with conversation class to an optimal sound level, and renders audio objects of other class at a background sound level.

Audio object 321 is classified as conversation class. In one embodiment, audio output pacer 320 maintains the amplitude of the audio object content in audio object 321 to no lower than 65 dB. In another embodiment, audio output pacer 320 applies echo cancellation to audio object content. In yet another embodiment, audio output pacer 320 applies white noise reduction to audio object content.

Audio object 323 and an audio object 324 are both classified as other class. In one embodiment, audio output pacer 320 attenuates the amplitude of the audio object content in audio object 323 and audio object 324 to no higher than 35 dB each. In another embodiment, audio output pacer 320 attenuates the amplitude of the audio object content in audio object 323 and audio object 324 so that their amplitudes are no higher than the amplitude of the audio object 321 classified as conversation class.

Processing Audio Objects Based on Other Audio Object

Figure 4:
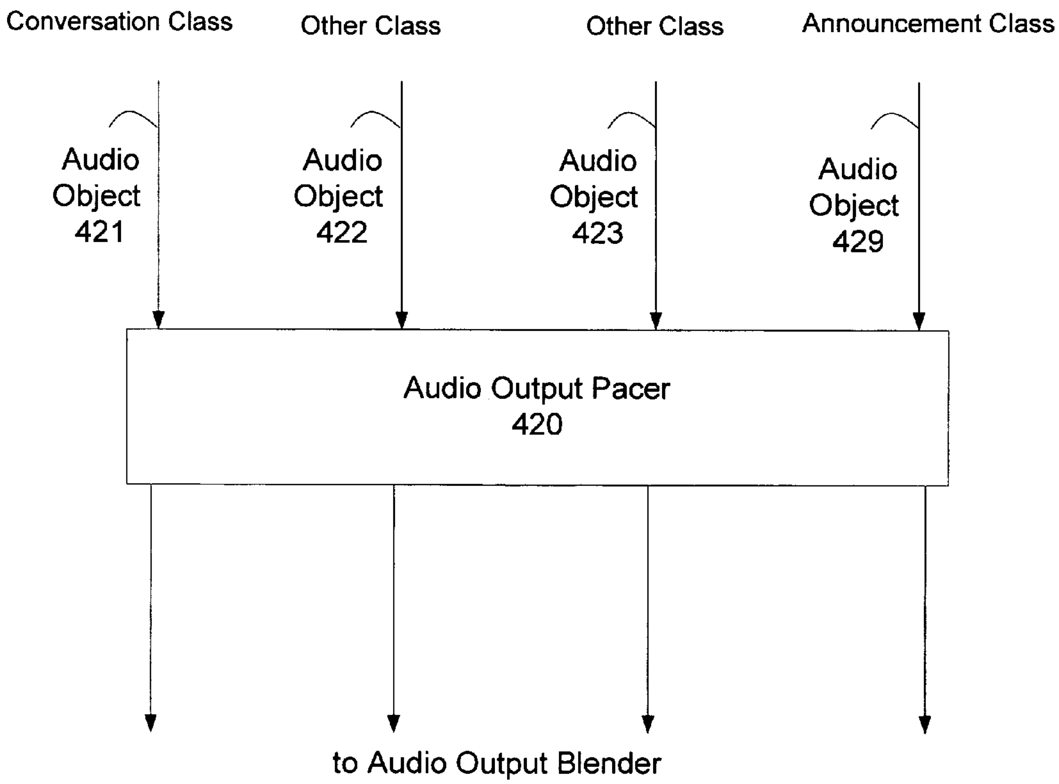
FIG. 4 illustrates a block diagram of a system for adjusting the sound of audio objects based on other audio objects.

FIG. 4 illustrates a block diagram of a process performed on audio objects based on other audio objects.

Audio output pacer 420 processes a plurality of audio objects in the presence of one or more other audio objects classified as announcement class so that the announcement contained in the audio object classified as announcement class is not interrupted or caused interference by other audio objects.

Audio object 421 is classified as conversation class; audio object 422 is classified as other class; audio object 423 is classified as other class; audio object 429 is classified as announcement class. In one embodiment, audio output pacer 420 attenuates the amplitude of the audio object content in audio object 421 to 0 dB, and suspends the processing of audio object 422 and audio object 423. In one embodiment, when audio output pacer 420 finishes processing audio object 429, audio output pacer 420 restores the amplitude of the audio object content in audio object 421 to the original level, and resumes processing of audio object 422 and audio object 423.

In yet another embodiment, audio output pacer 420 attenuates the amplitude of the audio object content in audio object 423 and audio object 424 so that their amplitudes are no higher than the amplitude of audio objects of higher ranked class. In such an embodiment, a ranking of classes is compiled and stored or programmed into audio output pacer 420 so that rank of any given class of audio object relative to other audio objects can easily and quickly be determined by audio output pacer. In one embodiment audio output pacer 420 includes a memory. In another embodiment, audio output pacer 420 can access an external memory to retrieve the ranking of any given audio object. For example, in the foregoing embodiment, announcement class is ranked higher than conversation class and other class. The following is an example of a possible class ranking according to one embodiment of the present invention.

| Rank | Class |
|---|---|
| 4 | Announcement |
| 3 | Conversation |
| 2 | Music |
| 1 | Other |

In the example above, announcement class is ranked higher than every other class, and would be processed accordingly. However, in a scenario in which there is no audio object classified as announcement class, then an audio object classified as conversation class would take priority over all other audio objects present.

Audio Output Blender

Processing Audio Objects from Audio Output Pacer

Figure 5:
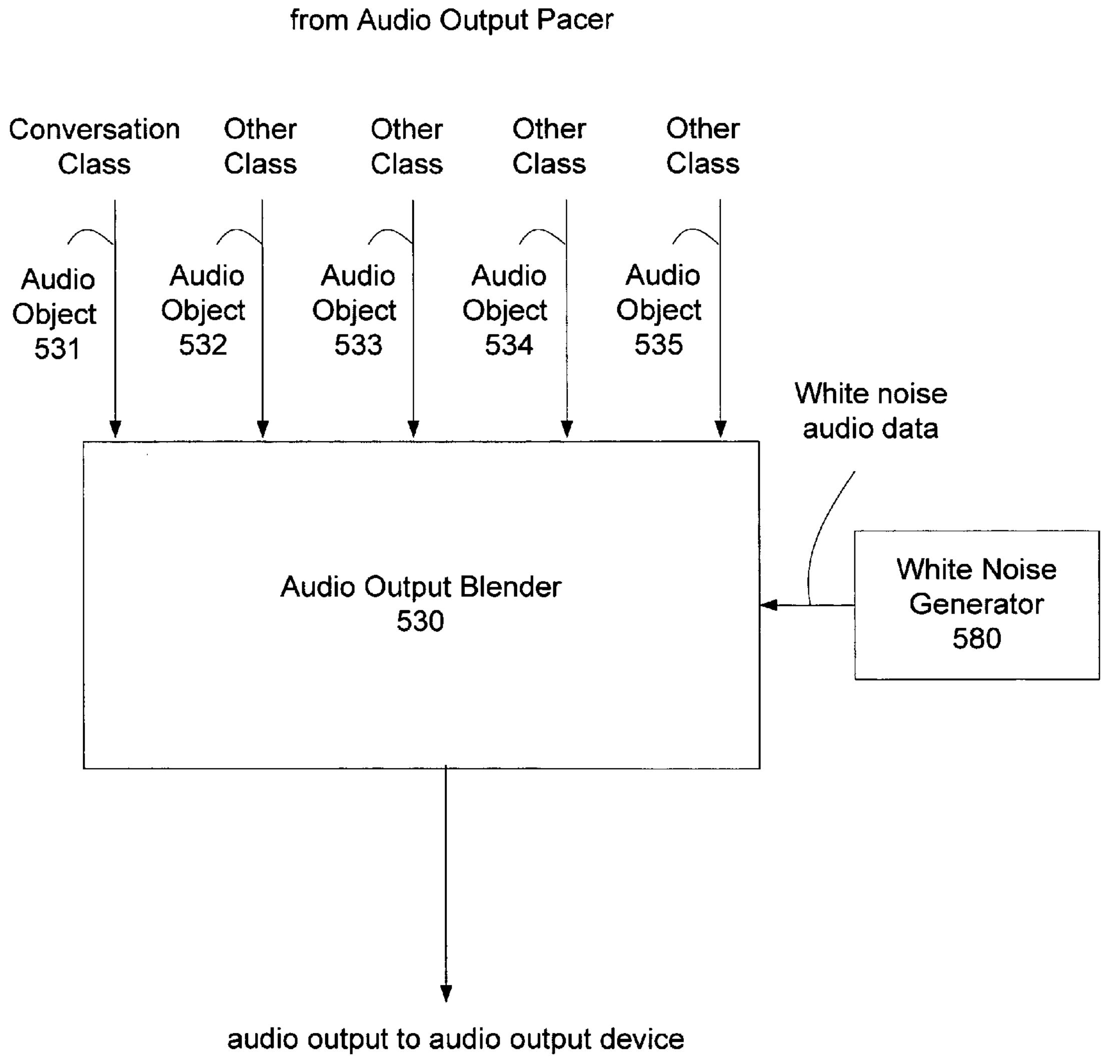
FIG. 5 illustrates a block diagram of a system for combining the sound of multiple audio objects into one audio output.

FIG. 5 illustrates a block diagram of a process to combine a plurality of audio objects into one audio output.

Audio output blender 530 receives a plurality of audio objects from audio output pacer. Audio object 531 is classified as conversation class whereas audio object 532, audio object 533, audio object 534 and audio object 535 are all classified as other class. Audio output blender 530 normalizes the amplitude of the audio object content of each audio object, such that the total amplitude of the combined audio output stays at a comfortable level. In one embodiment, the comfortable level is at 65 dB. In another embodiment, the comfortable level is at 80 dB In one embodiment, audio output blender 530 allocates 80% of the total amplitude to the audio object classified as conversation class, and 20% to all audio object classified as other class. Audio output blender 530 further divides the 20% amplitude allotment among all the audio objects classified as other class. In such an embodiment, audio output blender 530 allocates 5% each to audio object 532, audio object 533, audio object 534 and audio object 535. Audio output blender 530 adjusts the amplitude of the audio object content in audio object 531, audio object 532, audio object 533, audio object 534 and audio object 535 accordingly.

In one embodiment, audio output blender 530 includes a white noise generator 580. In one embodiment, audio output blender 530 instructs white noise generator 580 to generate white noise audio data at 20 dB. Audio output blender 530 combines the processed audio object 531, audio object 532, audio object 533, audio object 534, audio object 535, and the white noise audio data into a single audio output and sends the audio output to the audio output device.

Figure 6:
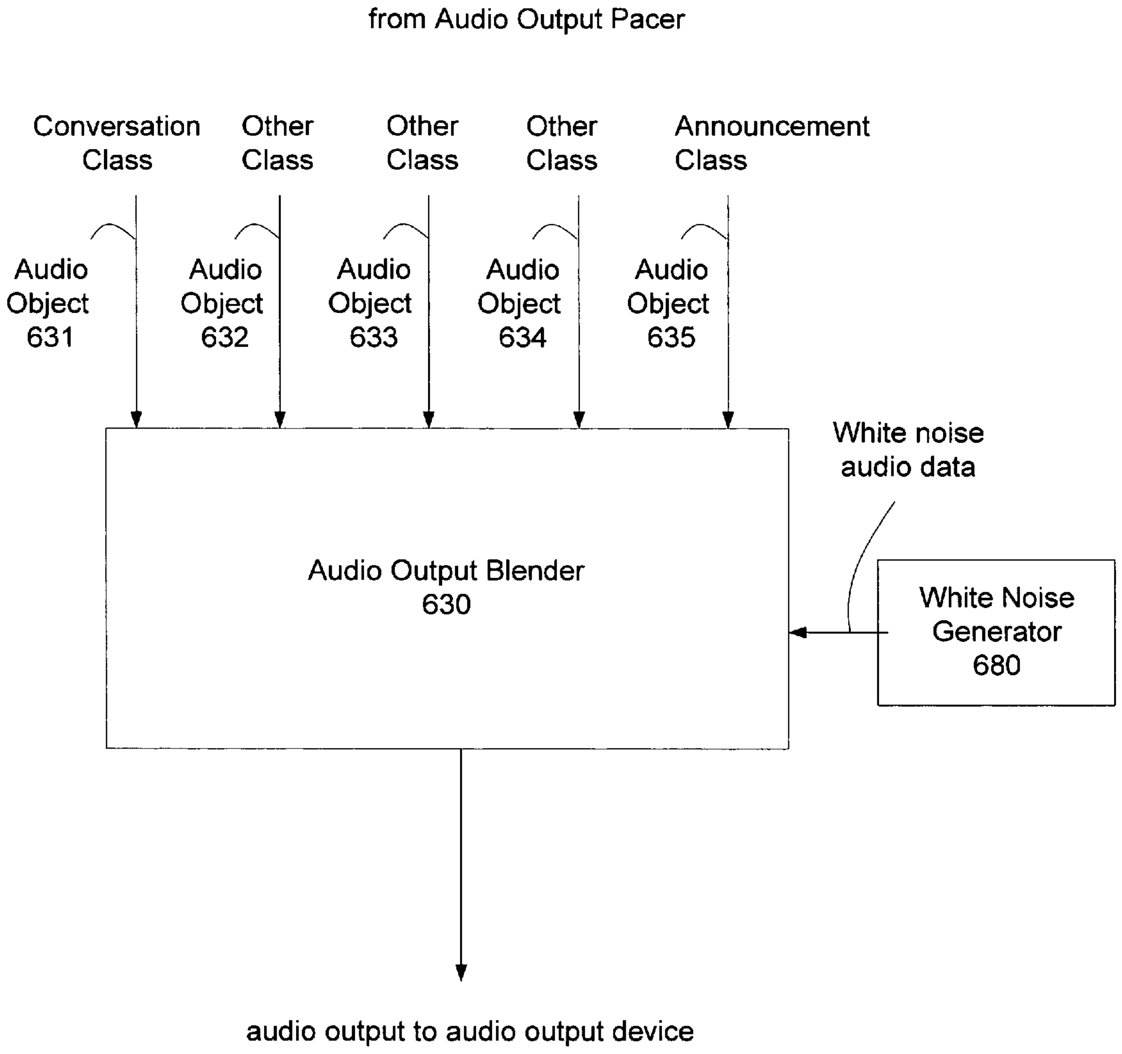
FIG. 6 illustrates a block diagram of a system for combining the sound of multiple audio objects into one audio output when one of the audio objects is classified as announcement class.

FIG. 6 illustrates a block diagram of combining a plurality of audio objects into one audio output when one of the audio objects is classified as announcement class.

Audio object 631 is classified as conversation class; audio object 632, audio object 633, and audio object 634 all are classified as other class; audio object 635 is classified as announcement class. In one embodiment, audio output blender 630 allocates 100% of the total 80 dB amplitude to the audio object classified as announcement class. Audio output blender 630 attenuates the amplitude of the audio object content in audio object 631, audio object 632, audio object 633 and audio object 634 to 0 dB. Audio output blender 630 boosts the amplitude of the audio object content in audio object 635 to 80 dB.

Other Audio Object Class

In one embodiment, the audio object class further includes music class and speech class. An audio object with music class contains music audio data. An audio object with speech class contains recorded speech audio data.

Figure 7:
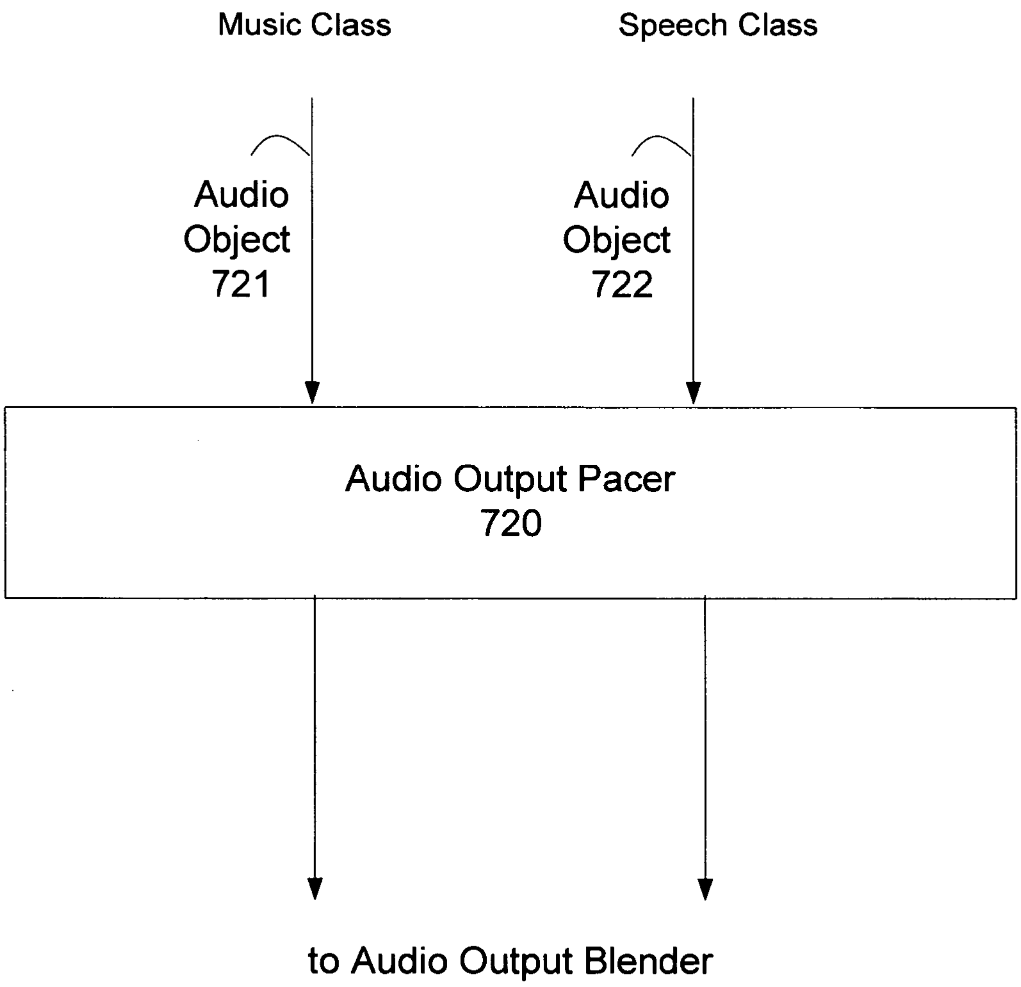
FIG. 7 illustrates a block diagram of a system for adjusting the sound of audio objects classified as music class and audio object classified as speech class.

FIG. 7 illustrates a block diagram of processing audio objects classified as music class and audio object classified as speech class. Audio output pacer 720 filters out frequencies outside of human speech from an audio object classified as speech class in order to enhance the speech clarity. Audio output pacer 720 retains the spectrum of frequencies in an audio object classified as music class. Audio object 721 is classified as music class; audio object 722 is classified as speech class. In one embodiment, audio output pacer 720 filters out frequencies higher than 4 KHz from the audio object content in audio object 722.

Processing Audio Objects Based on the Dynamic Properties

Figure 8:
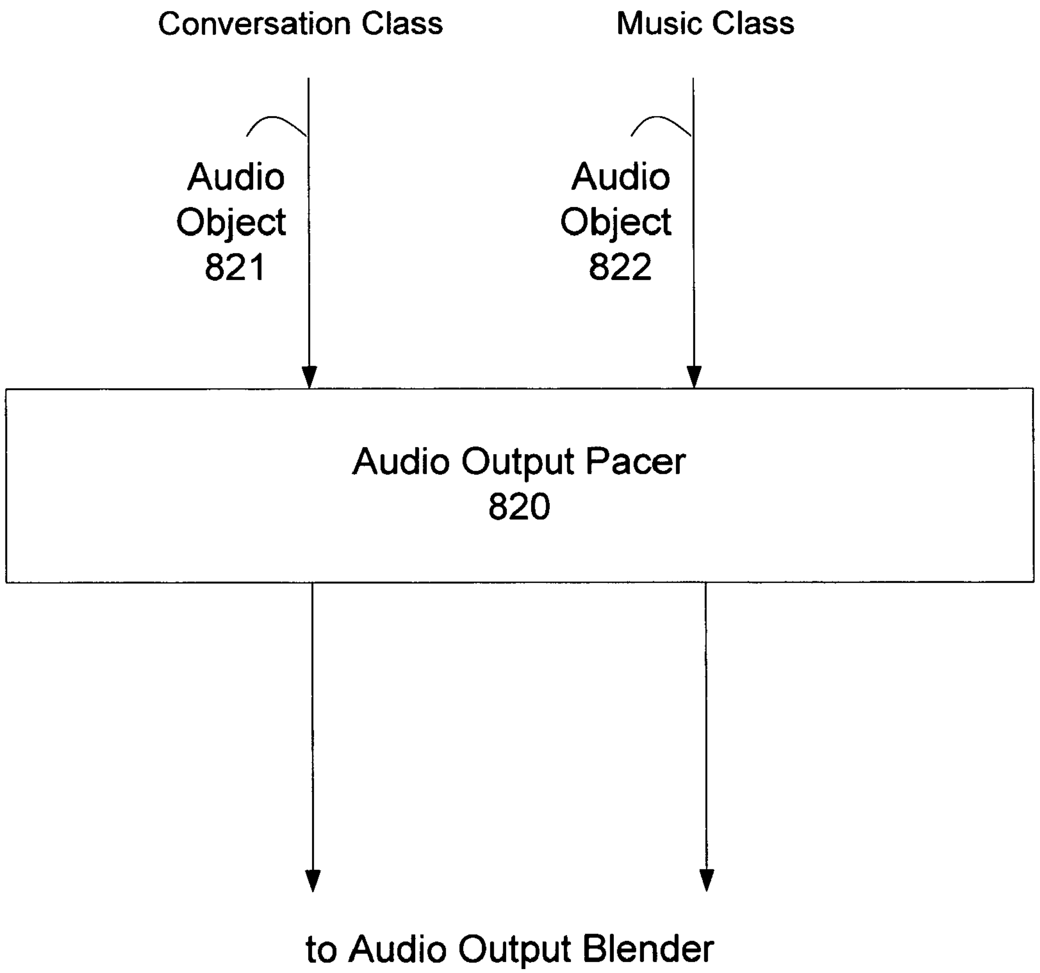
FIG. 8 illustrates a block diagram of a system for adjusting the sound of audio objects based on the dynamic properties of the audio objects.

FIG. 8 illustrates a block diagram of processing audio objects based on the dynamic properties of the audio objects. As used herein, dynamic property of an audio object refers to the amplitude and frequency of the audio object content at the time of processing. Audio output pacer 820 modifies an audio object based on the dynamic property of the audio object in order to overcome rapid and uncomfortable changes in amplitude and frequencies.

Audio object 821 is classified as conversation class and audio object 822 is classified as music class. In one embodiment, audio output pacer 820 detects that the white noise level of the audio object content in audio object 821 is higher than 40 dB. Audio output pacer 820 filters out the white noise from the audio object content in audio object 821. In another embodiment, audio output pacer 820 detects that the amplitude of the audio object content in audio object 822 exceeds 60 dB. Audio output pacer 820 attenuates the amplitude of the audio object content in audio object 822 to 35 dB or some other predetermined comfort level.

Processing Audio Objects Based on the Dynamic Properties of Other Audio Objects

Figure 9:
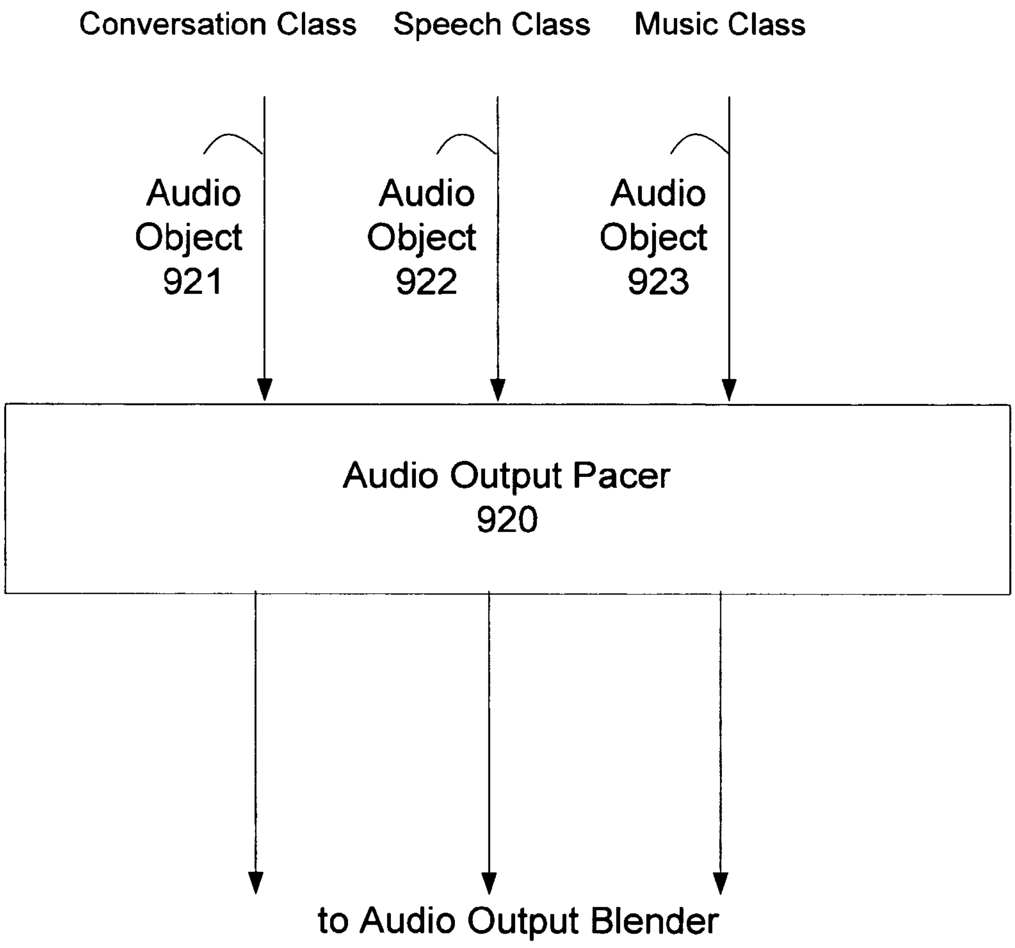
FIG. 9 illustrates a block diagram of a system for adjusting the sound of audio objects based on the dynamic properties of other audio objects.

FIG. 9 illustrates a block diagram of processing an audio object based on the dynamic properties of other audio objects. Audio output pacer 920 modifies an audio object based on the dynamic properties of other audio objects in order to provide a smooth and pleasant transition.

Audio object 921 is classified as conversation class, audio object 922 is classified as speech class and audio object 923 is classified as music class. In one embodiment, audio object Pacer 920 can detect that the amplitude of the audio object content in audio object 921 has been at lower than 10 dB for the past 5 seconds, indicating a silent period. In one embodiment, audio output pacer 920 can respond to silent periods by gradually increasing the amplitude of the audio object content in audio object 922 to 60 dB or some other comfortable level. In one embodiment, audio output pacer 920 can respond to silent periods by increasing the amplitude of the audio object content in audio object 922 gradually to 60 dB over 4 seconds. In another embodiment, audio output pacer 920 increases the amplitude of the audio object content in audio object 922 gradually to 60 dB over 15 seconds. In one embodiment, audio output pacer 920 does not change the amplitude of the audio object content in audio object 923.

In one embodiment, audio output pacer 920 can detect that the amplitude of the audio object contained in audio object 921 has increased; for example, from 10 dB to 40 dB, in the past 100 milliseconds or some other predetermined period of time. Audio output pacer 920 can attenuate the increased amplitude of the audio object content in audio object 922 back to some lower level. In one embodiment, audio output pacer 920 attenuates the amplitude gradually to the original level in the next 5 seconds. In another embodiment, audio output pacer 920 attenuates the amplitude back to the original level immediately. In one embodiment, audio output pacer 920 does not change the amplitude of the audio object content in audio object 923.

Audio Output Mixer Revisited

In one embodiment, audio output mixer includes a datastore. In one embodiment, the datastore stores user preferences. Audio output mixer processes audio objects based on user preferences. In one embodiment, user preferences indicate to turn off background music. Audio output mixer attenuates the amplitude of audio object with music class to 0 dB. In another embodiment, the user preferences indicate to turn the volume for conversation to maximum. Audio output mixer boosts the amplitude of audio object with conversation class to 90 dB or some other predetermined maximum level.

In one embodiment, audio output mixer includes the capability to receive instructions from a user. Audio output mixer processes the plurality of audio object accordingly.

In one embodiment, audio output mixer includes the capability to receive instructions from the other party of a conversation, and can determine how to process the audio objects based on instructions from the other party. In one embodiment, an instruction indicates to give preferential treatment to audio object classified as speech class. Audio output mixer boosts the amplitude of the audio object with speech class to 65 dB, and lowers the amplitude of other audio object to 35 dB. In one embodiment, audio output mixer receives instructions at setup time of the conversation. In another embodiment, audio output mixer receives instructions during the conversation. In yet another embodiment, audio output mixer receives instructions both at setup time of the conversation and during the conversation.

A Phone for Receiving Multiple Audio Data

In one embodiment, a phone that can receive and process multiple audio data object during a phone call includes an audio output mixer. A user uses the phone to establish a phone call with another party. The phone processes the multiple audio data into corresponding audio objects. One of the audio objects contains the phone conversation. The audio output mixer processes the plurality of audio objects into a single audio output to conform to the hearing constraints, and to enhance the overall listening experience for the user as described herein. Audio output mixer sends the single audio output to the phone's audio output device.

Other Audio Devices that Receives Multiple Audio Data

In one embodiment, a headset with the capability of receiving and processing multiple audio data includes an audio output mixer. In one embodiment, the audio output mixer can process audio objects representing sounds from the environment. Audio output mixer can monitor the amplitude of the audio object. In one embodiment, audio output mixer can detect that the amplitude is below some threshold, in which case, audio output mixer attenuates that audio object to 0 dB. In one embodiment, audio output mixer can detect that the amplitude is above a threshold, in response audio output mixer can attenuate the amplitude of the audio object to a comfortable listening level for the headset user, and can attenuate all other audio object to 0 dB. In one embodiment, the threshold is 100 dB. In another embodiment, the threshold is 85 dB. In one embodiment, the comfortable listening level is 14 dB. In another embodiment, the comfortable listening level is 16 dB.

In another embodiment, audio output mixer can monitor for certain audio patterns in the audio object representing sounds from the environment for safety sakes. In many everyday situations it can be dangerous for a person to be completely blocked off from the sounds of everyday life and their environment. Everyday people are alerted to possible danger and potential hazards by both intended and unintended environmental sounds. Fire engines alert motorists and pedestrians alike to get out of the may of a speeding truck while screams, cries and other sounds can alert people of trouble or distress. Of the many forms of alarms and alerts it is necessary to stay aware of, any and all of them can be detected by listening to the distinct audio patterns of such sounds including, but not limited to, sirens, alarms, traffic noise, and cries for help. In one embodiment, if audio output mixer does not detect select environmental audio patterns, then audio output mixer can attenuate environmental audio objects to 0 dB. If audio output mixer does detect environmental audio patterns, then audio output mixer can attenuate the amplitude of the environmental audio objects to a comfortable listening level for the headset user, and can attenuate all other audio object to 0 dB. In one embodiment, environmental audio pattern represents a roaring train, a barking dog, an emergency siren, a ringing phone, or screeching tires. A user using the headset to listen to music, radio or a phone call will be able to hear the sounds from the environment under the aforementioned conditions.

In one embodiment, there are other audio devices that receive and process multiple audio data. In one embodiment, the audio device includes an audio output mixer in order to enhance the device user's listening experience. The processing of audio object depends on the specific functionalities of the audio device. Skilled in the art should be able to apply the illustrations to tailor the processing of audio object accordingly.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. An audio output mixer for adjusting sounds of a plurality of audio objects directed toward an audio output device comprising:

an audio output pacer, wherein the audio output pacer:

receives the plurality of audio objects, each audio object comprising:

an audio content comprising audio data, and audio object attributes comprising an audio object class of a plurality of audio object classes, wherein the plurality of audio objects comprises at least one audio object comprising speech audio data and at least one audio object comprising non-speech audio data, wherein the plurality of audio object classes comprises at least one speech audio object class for the audio objects comprising speech audio data and at least one non-speech audio object class for the audio objects comprising non-speech audio data, retrieves from a storage rankings of the plurality of audio object classes of the plurality of audio objects, and modifies the sounds of one or more of the plurality of audio objects according to the rankings of the audio object classes of the plurality of audio objects, wherein the modified sounds of the audio objects comprising the speech audio object classes with a given ranking are more intelligible than the modified sounds of the audio objects comprising non-speech audio object classes with a ranking lower than the given ranking; and an audio output blender, wherein the audio object blender:

receives from the audio output pacer the modified sounds of the plurality of audio objects, combines the modified sounds of the plurality of audio objects into a single audio output, and sends the single audio output to the audio output device.

2. The mixer of claim 1, wherein the audio output pacer further retrieves from the storage user preferences, wherein the audio output pacer modifies the sounds of the plurality of audio objects according to the user preferences and the rankings of the audio object classes of the plurality of audio objects.

3. The mixer of claim 1, wherein the speech audio object classes comprises a conversation class, wherein each audio object of the conversation class comprises sounds of a conversation, wherein the audio output pacer further modifies the sounds of the conversation to be more intelligible than the sounds of the audio objects comprising the audio object classes with rankings lower than the conversation class.

4. The mixer of claim 3, wherein the speech audio object classes further comprise an announcement class and the non-speech audio object classes comprise a music class.

5. The mixer of claim 4, wherein the audio output pacer further modifies the sounds of the audio objects comprising the announcement class to be more intelligible than the sounds of the other audio objects of the plurality of audio objects.

6. The mixer of claim 4, wherein the audio output pacer further modifies the sounds of the audio objects comprising the conversation class to be more intelligible than the sounds of the audio objects comprising the music class.

7. A method of adjusting sounds of a plurality of audio objects comprising:

receiving a plurality of audio objects by an audio device, each audio object comprising:

an audio content comprising audio data, and audio object attributes comprising an audio object class of a plurality of audio object classes, wherein the plurality of audio objects comprises at least one audio object comprising speech audio data and at least one audio object comprising non-speech audio data, wherein the plurality of audio object classes comprises at least one speech audio object class for the audio objects comprising speech audio data and at least one non-speech audio object class for the audio objects comprising non-speech audio data;

retrieving from a storage by the audio device rankings of the plurality of audio object classes; and modifying by the audio device sounds of one or more of the plurality of audio objects according to the rankings of the audio object classes of the plurality of audio objects, wherein the modified sounds of the audio objects comprising the speech audio object classes with a given ranking are more intelligible than the modified sounds of the audio objects comprising the non-speech audio object classes with a ranking lower than the given ranking.

8. The method of claim 7, further comprising:

combining by the audio device the modified sounds of the plurality of audio objects into a single audio output; and sending by the audio device the single audio output to an audio output device.

9. The method of claim 7, wherein the retrieving further comprises retrieving from the storage user preferences, wherein the modifying further comprises modifying by the audio device the sounds of the plurality of audio objects according to the user preferences and the rankings of the audio object classes of the plurality of audio objects.

10. The method of claim 7, wherein the speech audio object classes comprises a conversation class, wherein each audio object of the conversation class comprises sounds of a conversation, wherein the modifying comprises:

modifying by the audio device the sounds of the conversation to be more intelligible than the sounds of the audio object comprising the audio object classes with rankings lower than the conversation class.

11. The method of claim 10, wherein the speech audio object classes further comprise an announcement class and the non-speech audio object classes comprise a music class.

12. The method of claim 11, wherein the modifying further comprises:

modifying by the audio device the sounds of the audio objects comprising the announcement class to be more intelligible than the sounds of the other audio objects of the plurality of audio objects.

13. The method of claim 11, wherein the modifying further comprises:

modifying by the audio device the sounds of the audio objects comprising the conversation class to be more intelligible than the sounds of the audio objects comprising the music class.

14. A computer program product comprising a computer useable medium having a computer readable program, wherein the computer readable program when executed on a computer causes the computer to:

receive a plurality of audio objects, each audio object comprising:

an audio content comprising audio data, and audio object attributes comprising an audio object class of a plurality of audio object classes, wherein the plurality of audio objects comprises at least one audio object comprising speech audio data and at least one audio object comprising non-speech audio data, wherein the plurality of audio object classes comprises at least one speech audio object class for the audio objects comprising speech audio data and at least one non-speech audio object class for the audio objects comprising non-speech audio data;

retrieve from a storage rankings of the plurality of audio object classes; and modify sounds of one or more of the plurality of audio objects according to the rankings of the audio object classes of the plurality of audio objects, wherein the modified sounds of the audio objects comprising the speech audio object classes with a given ranking are more intelligible than the modified sounds of the audio objects comprising the non-speech audio object classes with a ranking lower than the given ranking.

15. The product of claim 14, wherein the computer readable program when executed on the computer further causes the computer to:

combine the modified sounds of the plurality of audio objects into a single audio output; and send the single audio output to an audio output device.

16. The product of claim 14, wherein the computer readable program when executed on the computer further causes the computer to:

retrieve from the storage user preferences, and modify the sounds of the plurality of audio objects according to the user preferences and the rankings of the audio object classes of the plurality of audio objects.

17. The product of claim 14, wherein the speech audio object classes comprises a conversation class, wherein each audio object of the conversation class comprises sounds of a conversation, wherein the computer readable program when executed on the computer further causes the computer to:

modify the sounds of the conversation to be more intelligible than the sounds of the audio object comprising the audio object classes with rankings lower than the conversation class.

18. The product of claim 17, wherein the speech audio object classes further comprise an announcement class and the non-speech audio object classes comprise a music class.

19. The product of claim 18, wherein the computer readable program when executed on the computer further causes the computer to:

modify the sounds of the audio objects comprising the announcement class to be more intelligible than the sounds of the other audio objects of the plurality of audio objects.

20. The product of claim 18, wherein the computer readable program when executed on the computer further causes the computer to:

modify the sounds of the audio objects comprising the conversation class to be more intelligible than the sounds of the audio objects comprising the music class.

* * * * *